United States Patent
Birecki et al.

(10) Patent No.: US 7,585,687 B2
(45) Date of Patent: Sep. 8, 2009

(54) ELECTRON EMITTER DEVICE FOR DATA STORAGE APPLICATIONS AND METHOD OF MANUFACTURE

(75) Inventors: Henryk Birecki, Palo Alto, CA (US); Vu Thien Binh, Lyons (FR); Si-ty Lam, Pleasanton, CA (US); Huei Pei Kuo, Cupertino, CA (US); Steven L. Naberhuis, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 913 days.

(21) Appl. No.: 10/932,695

(22) Filed: Sep. 1, 2004

(65) Prior Publication Data

US 2005/0029920 A1  Feb. 10, 2005

(51) Int. Cl.
*H01L 21/66* (2006.01)
(52) U.S. Cl. .......................... 438/20; 438/686; 438/687
(58) Field of Classification Search .................. 438/20; 257/10
See application file for complete search history.

(56) References Cited

U.S. PATENT DOCUMENTS

| | | | |
|---|---|---|---|
| 3,755,704 A | * | 8/1973 | Spindt et al. ............... 313/309 |
| 3,789,471 A | * | 2/1974 | Spindt et al. ................. 445/52 |
| 4,498,952 A | * | 2/1985 | Christensen .................. 438/20 |
| 4,663,559 A | * | 5/1987 | Christensen ................ 313/336 |
| 5,844,250 A | * | 12/1998 | Itoh et al. ..................... 257/10 |
| 6,091,190 A | * | 7/2000 | Chalamala et al. ...... 313/346 R |
| 6,976,895 B2 | * | 12/2005 | Birecki et al. ................. 445/23 |

* cited by examiner

*Primary Examiner*—Kenneth A Parker
*Assistant Examiner*—Jose R Diaz

(57) ABSTRACT

A field emission device, which among other things may be used within an ultra-high density storage system, is disclosed. The emitter device includes an emitter electrode, an extractor electrode, and a solid-state field controlled emitter that utilizes a Schottky metal-semiconductor junction or barrier. The Schottky metal-semiconductor barrier is formed on the emitter electrode and electrically couples with the extractor electrode such that when an electric potential is placed between the emitter electrode and the extractor electrode, a field emission of electrons is generated from an exposed surface of the semiconductor layer. Further, the Schottky metal may be selected from typical conducting layers such as platinum, gold, silver, or a conductive semiconductor layer that is able to provide a high electron pool at the barrier. The semiconductor layer placed on the Schottky metal is typically very weakly conductive of n-type and has a wide band gap in order to create conditions conducive to creating induced negative electron affinity at applied fields necessary to provide electron emission. One type of wide band-gap material can be selected from titanium dioxide or titanium nitride or other comparable materials.

6 Claims, 2 Drawing Sheets

ELECTRON EMITTER DEVICE FOR DATA STORAGE APPLICATIONS AND METHOD OF MANUFACTURE

BACKGROUND OF THE INVENTION

Another application in emitter devices is described in commonly assigned co-pending U.S. patent application Ser. No. 10/043,376, entitled "PLANAR ELECTRON EMITTER APPARATUS WITH IMPROVED EMISSION AREA AND METHOD OF MANUFACTURE," the disclosure of which is hereby incorporated herein by reference.

The present invention relates generally to ultra-high density storage devices using field emission electron emitter technology and, more particularly, the present invention relates to an improved field emission emitter that utilizes a Schottky metal-semiconductor barrier to provide solid state emission for use within the storage device.

Memory storage systems have made tremendous advancements over the years from the first use of magnetic tape to magnetic hard drives and now optical drives as well as sophisticated fast memory such as S-RAM and D-RAM. A more recent development has utilized field emission electron emitters within an ultra-high density storage device. The field emission emitters have typically been fabricated in tip-geometry that emit beams of electrons from the sharp points at the end of the tips. Electron beams are utilized to read or write to a storage medium that is located proximate the field emitters. An array of field emitters may match the array of storage areas within the storage medium or a smaller array of field emitters may be moved relative to the storage medium to access the storage locations on the storage medium.

An example of an ultra-high density storage device utilizing field emitter technology is disclosed in U.S. Pat. No. 5,557,596. Each field emitter typically generates an electron beam impinging on a storage area to generate a signal current or voltage. Each storage area can be in one of a few different states, and are most typically in a binary state of either 1 or 0 represented by a high bit or a low bit. The magnitude of the signal current generated by the beam current impinging on the storage area depends on the state of the storage area. Thus, the information stored in the area can be read by measuring the magnitude of the signal current.

The electron beam may also be utilized to write information into the storage area. The power of each electron beam can be increased to change the state of the storage area on which it impinges. By changing the state of the storage area, a bit of information is stored or erased in the storage area, depending upon the beam strength.

The speed and accuracy of information stored, retrieved, and accessed greatly depend upon the efficiency of the field emitters. Further, the manufacturing steps necessary to produce and fabricate field tip emitters is extremely complex. Furthermore, since the storage medium is spaced apart from the field emitters utilized to read or write the information thereof, it is necessary to place those elements within a protective casing under high-vacuum, on the order of $10^{-7}$ Torr or less, in order to protect the delicate surfaces of both the emitter tips and the memory array from environmental effects. High-vacuums are expensive and difficult to achieve.

What is needed in the field emission emitter technology area is a field emission electron emitter that provides a higher efficiency than the prior art, that can be made more consistently at a lower cost than the prior art, and that is more immune to environmental effects as well as the need for high vacuum environments typically required in the prior art.

SUMMARY OF THE INVENTION

According to the present invention, a field emission device, which among other things may be used within an ultra-high density storage system, is disclosed. The emitter device includes an emitter electrode, an extractor electrode, and a solid-state field controlled emitter that utilizes a Schottky metal-semiconductor junction or barrier. The Schottky metal-semiconductor barrier is formed on the emitter electrode and electrically couples with the extractor electrode such that when an electric potential is placed between the emitter electrode and the extractor electrode, a field emission of electrons is generated from an exposed surface of the semiconductor layer. Further, the Schottky metal may be selected from typical conducting layers such as platinum, gold, silver, or a conductive semiconductor layer that is able to provide a high electron pool at the barrier. The semiconductor layer placed on the Schottky metal is typically very weakly conductive of n-type and has a wide band gap in order to create conditions conducive to creating induced negative electron affinity at applied fields necessary to provide electron emission. One type of wide band-gap material can be selected from titanium dioxide or titanium nitride or other comparable materials.

The field emission device further includes a focusing electrode that is electrically coupled to a solid state field controlled emitter and operates in conjunction with the extractor electrode to focus the electron beam emission to a small spot size within the range of 10 to 50 nanometers at the storage medium surface. Dielectric insulating layers are placed between the extractor electrode and the emitter electrode and between the extractor electrode and the focusing electrode. The use of the Schottky metal-semiconductor barrier enhances the ability of flat emitter structures to operate in field emission devices and further optimizes the ability of tip-based emitters in their operation.

A process is further disclosed in accordance with the present invention that is utilized to fabricate the field emission devices as defined above. A first step includes forming an emitter electrode layer upon a substrate surface. Then, a Schottky metal layer is formed on the emitter electrode layer. The emitter electrode layer and the Schottky metal layer may be one and the same. Next, a semiconductive layer is formed over the Schottky metal to form the solid-state field controlled emitter and provide the Schottky metal-semiconductor junction. Next, an extracting electrode layer is formed proximate the conductive semiconductor layer. In an alternative embodiment, a focus electrode layer is formed proximate the extracting electrode layer with necessary dielectric layers placed between the various electrode layers and the semiconductive layer. Alternatively, the semiconductive layer of the Schottky junction is formed after the extracting and focusing structures are created.

One preferred embodiment of the present invention is to utilize the field emission devices within an ultra-high density storage apparatus. Such a storage apparatus comprises a storage medium along with at least one field emission device. The storage medium typically includes a storage area in which one of a plurality of states is placed to represent the information stored in that storage area. The field emission device provides an electron-beam current that is utilized to read and write that information stored in the storage areas. The storage area typically has a large array of storage arrays densely packed and accessed by another array of field emission devices. In that embodiment, the field emission devices may match in array size the array of the storage medium while in other embodiments the field emission devices may be placed in a smaller array and moved relative to the storage area to perform the read and write functions. Alternatively, the storage medium may be moved relative to the electron beam or electron beams steered using electric or magnetic fields, or both.

In operation electrons are injected across the Schottky junction from the metal into the conduction band of the semiconductor and then into vacuum ending up being focused on the medium surface. Typically, the junction has a barrier height ranging from 0.2 eV to 2.0 eV. Under appropriate conditions negative electron affinity is generated in the semiconductor due to injected charge distribution that results in much lower fields required for operation.

BRIEF DESCRIPTION OF THE DRAWINGS

Features and advantages of the present invention will become apparent to those skilled in the art from the following description with reference to the drawings, in which.

DETAILED DESCRIPTION OF SPECIFIC EMBODIMENTS

Figure 1:
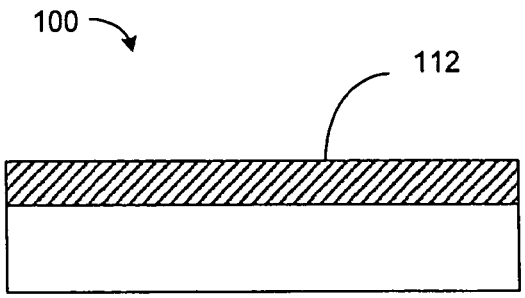
FIG. 1 is a cross-sectional view of a field emission emitter device substrate with electrode layer applied thereto.

An improved field emission emitter structure that is typically utilized within an ultra-high density storage device is disclosed in FIGS. 1-6. The emitter structure 100 utilizes a solid state mechanism to enhance and improve electron emission for use in structures such as ultra-high density storage devices, previously disclosed in U.S. Pat. No. 5,557,596, incorporated by reference for all purposes, and in field emission-based display systems such as the type disclosed in U.S. Pat. No. 5,587,628, incorporated by reference for all purposes. The structure is also based on the structure described and illustrated in WO 00/70638, published Nov. 23, 2000, as well as French patent No. FR9906254.

The solid state mechanism utilizes a thin metal layer placed upon the emitter electrode of the field emission electron emitter device. Next, a thin layer of wide band-gap semiconductor material is placed upon the metal layer, which forms a Schottky metal-semiconductor junction to enhance electron beam formation and transmission. Since the formation of the beam of electrons and their transmission occurs at an interface protected from environment, the emitter structure becomes less sensitive to environmental factors such as contamination. Therefore, temporal and spatial emitted beam instabilities due to molecular desorption and adsorption commonly found in prior art emitter structures lacking the Schottky metal-semiconductor junction are minimized. Further, the solid-state mechanism lowers the field required for emission thereby reducing driver voltage requirements that have been an impediment to the use of flat emitter geometries and can also eliminate the need for intrinsically low material work-function materials required in the prior art.

The barrier further provides a high level of immunity from contaminants migrating in strong electric field gradients associated with the emitter tip structures. The field gradients are reduced in the direction of the emitting area, thereby reducing the motion of material contaminants. Additionally, in a flat emitter geometry noise is minimized due to a current averaging over a larger emitting area than is otherwise provided in tip geometries. This flat emitter geometry is again made possible by the use of the Schottky metal-semiconductor junction and lowered fields required to emit electrons. The protective barrier also reduces the need for high vacuum during the finishing stages as contaminants that have plagued the prior art are of little effect now. This further reduces the cost of manufacture and improves the life span of devices incorporating the technology of the instant invention.

Each field emission electron emitter structure further includes additional electrodes that are utilized to perform electron extraction from the surface of the field emission emitter. An extraction electrode and a focusing electrode typically operate in conjunction with one another to provide the appropriate electric field necessary to first extract, then focus, or otherwise control, the emitted electron beam. Generally, flat emitter geometries provide a primarily collimated beam while tip emitter geometries provide a divergent beam.

The improved field emission emitter structures are fabricated using well-known semiconductor fabrication techniques such as those practiced by those skilled in the art. Typically, and for purposes of example only, the described methods and structures are performed on silicon substrate, but other semi-conductor materials may be readily substituted, such as using gallium arsenide or germanium in place of silicon, or the substrate can be nonconductive as glass or sapphire. A process, with the resulting structure at various stages and at completion of the field emission electron emitter, is now presented in conjunction with FIGS. 1-5.

FIG. 1 illustrates a cross-sectional view of an emitter device 100 that begins with a substrate 110 upon which the emitters are fabricated in various layers of semiconductor material, metal material, or oxide layers according to techniques and procedures well known to those skilled in the art. First, an electrode layer of conductive material 112 is fabricated on the first substrate 110. The top surface of the substrate may be planarized using generally accepted methods such as chemical-mechanical polishing (CMP). The layer 112 is typically comprised of metal or doped polycrystalline silicon to serve as the first portion of the emitter electrode utilized in the field emission electron emitter device 100 in accordance with the present invention. The conductive layer 112 may be optional in some embodiments.

Figure 2:
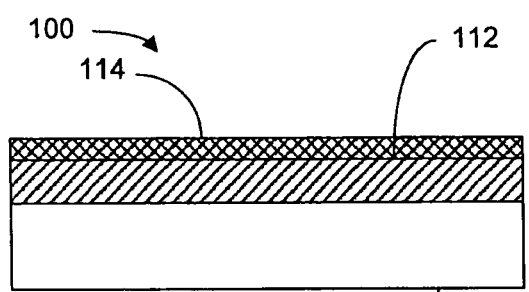
FIG. 2 depicts a cross-sectional view of the field emission emitter device according to FIG. 1 with a metal layer being deposited on the electrode layer.

Next, as illustrated in FIG. 2, a thin layer of metal 114 is deposited upon the surface of electrode layer 112 using conventional metal deposition techniques known to those skilled in the art. The metal layer 114 may be formed from a highly conductive and corrosion resistant metals (platinum, tungsten, molybdenum, titanium, copper, gold, silver, tantalum, etc. and any alloys or multilayered films thereof) that can bond with a semiconductor to form a Schottky metal-semiconductor barrier. The conductive layer 112 has a thickness range of 0.1 to 0.5 micrometers and metal layer 114 has a thickness ranging from 10 to 300 nanometers (nm), with 20 nm being preferred. Alternatively layers 112 and 114 can be combined and made of the material constituting layer 114 with a thickness assuring appropriate electrical conductivity.

Figure 3:
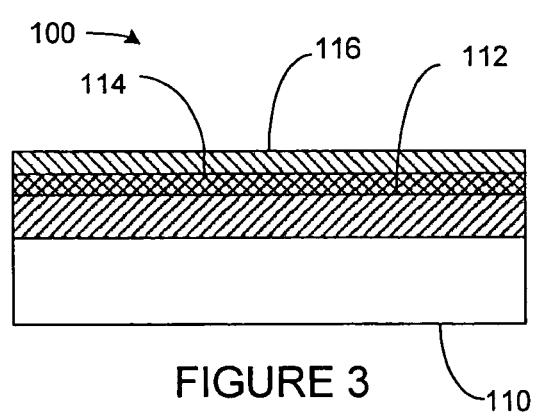
FIG. 3 illustrates a cross-sectional diagram of the field emission emitter device according to FIG. 2 wherein an insulating semiconductor layer is formed over the metal layer to form a Schottky metal-semiconductor junction.

Next, as illustrated in FIG. 3, a second semiconductor layer 116 is deposited upon metal layer 114. Semiconductor layer 116 is typically comprised of a wide band-gap semiconductor material such as titanium oxide ($TiO_2$). Other types of wide band gap semiconductor materials would also be suitable and include silicon carbide (SiC), diamond like carbon, $SiO_2$, $Al_2O_3$, tantalum pentoxide and others.

The metal-semiconductor boundary provides a solid state Schottky metal-semiconductor barrier. When an electric field is applied, electrons are injected into a field controlled low or negative electron affinity region within the thin semiconductor layer 116.

The emitter device 100 utilizes a layer of metal to serve as an electron reservoir and then includes an ultra thin layer of semiconductor material covering the metal layer. The semiconductor material is fabricated to provide a negative electron affinity surface area that is induced when a field is applied to the structure. For example semiconductor layer 116 may be formed from but not limited to materials such as the oxides, nitrides, and oxynitrides of silicon, aluminum, titanium, tantalum, tungsten, hafnium, zirconium, vanadium, niobium, molybdenum, chromium, yttrium, scandium, and combinations thereof. Electrons from the metal layer 114 tunnel through the thin semiconductor layer 116 near its surface and are emitted from the top of layer 116.

The thickness of insulating semiconductor layer 116 is selected to achieve the negative electron affinity condition upon application of an electric field. The lower bound on the thickness is determined by the minimum thickness required to create such region. The upper bound on the thickness of the semiconductor layer 116 is determined by the potential necessary to cause electron transport in the layer 116. The thicker the semiconductor layer 116 is, the higher the required potential. As such, the thickness of semiconductor layer 116 has a range of 2 to 8 nm with 5 nm being preferred.

Figure 4:
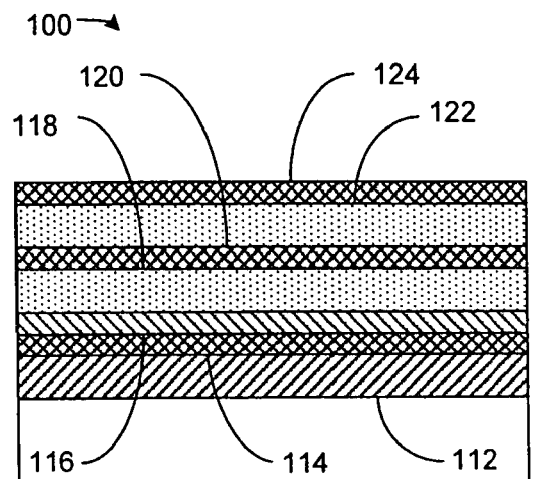
FIG. 4 depicts a cross-sectional view of the field emission emitter device according to FIG. 3 wherein additional insulating and metal layers are formed in accordance with the present invention.

After the Schottky metal-semiconductor barrier is formed, additional conventional processing steps are performed as illustrated in FIG. 4 in accordance with the present invention. These steps include providing electrodes proximate the field emission emitter surfaces on the surface of the emitter 100. Dielectric layers are also formed to provide separation and insulation from the surface of the emitter as well between the additional electrode layers. Alternatively, Schottky metal-semiconductor barrier is formed after other structures are created.

Another insulating dielectric 118 is grown on the surface of emitter 100, using conventional fabrication techniques well known to those skilled in the art. For example dielectric 118 may be formed from, but not limited to materials such as the oxides, nitrides, and oxynitrides of silicon, aluminum, titanium, tantalum, tungsten, hafnium, zirconium, vanadium, niobium, molybdenum, yttrium, scandium, and combinations thereof. The dielectric 118 may be formed such that the insulator is conformal with the layer 112. This layer 118 has a thickness ranging from 0.5 to 5 micrometers.

Next, a conductive layer 120 is deposited upon an oxide layer 118 using conventional processing techniques well known to those skilled in the art. The conductive layer 120 may be formed from metal (aluminum, tungsten, molybdenum titanium, copper, gold, silver, tantalum, etc. and any alloys or multilayered films thereof), doped polysilicon, graphite, etc. or combinations of metal and non-metal, e.g. C, films. Conductive layer 120 is typically utilized as an extracting electrode in the emitter structure 100.

Next, an insulating layer of dielectric material is applied in layer 122. Layer 122 may be identical to layer 118 and fabricated in the same manner or it may be of similar substance to provide a dielectric isolation between electrode metal layer 120 and a subsequent conductive layer 124.

Conductive layer 124 is fabricated on the surface of dielectric layer 122 using well-known fabrication techniques similar to that utilized to form layers 114 and 120. Layer 124 may be fabricated out of the same metal as that used in layers 114 and 120, but it may also be fabricated out of a different conductive metal typically used by those skilled in the art. Further, conductive layer 124 serves as a focusing electrode in focusing the emitted electrons from the surface of the emitter during operation to the storage medium proximate thereof, for one example.

A final patterning and etching is performed to open holes above semi-conductor layer 116 to expose the emitter surface. These techniques are well known to those skilled in the art and are used to form openings through conductive layers 120 and 124 and to etch back insulating dielectric layers 118 and 122 in such a way as to provide openings for the electrons to pass when utilized in their functional design. The holes typically have a diameter of about 0.1-10 micrometers.

Dielectric layer 122 typically has a thickness of about one half that of the hole diameter and ranges from 0.05 to 5 micrometers. Metal layer 120 typically has a thickness of about 0.05 to 0.3 micrometers. Likewise, conductive layer 124 typically has a thickness range of 0.05 to 0.3 micrometer. Further, although it has been depicted that conductive layer 120 serves as the extracting electrode and conductive layer 124 serves as a focusing electrode, their operations may combined so that they act in tandem to extract and focus electrons.

In another embodiment the wide band gap semiconductor layer 116 and possibly metal layer 114 are not formed until after the extracting electrodes 120 and 124 and associated dielectric layers 118 and 122 are deposited and hole apertures are created. Layers 114 and 116 are then deposited through these apertures directly on electrode 112.

It is further contemplated that not a single emitter structure 100 is fabricated at one time but generally an array of such emitter devices 100 are fabricated. For example, an array of 100-by-100 emitters 100 may be made to perform the read and write operations within the ultra-high density storage system described earlier. Further, a large array of such emitter devices may also be utilized in field emission display panels.

Although the emitter structure 100 has been illustrated to have an electrode layer 112, such a layer is optional such that semiconductor substrate 110 is properly doped sufficiently to serve as the emitter electrode with metal layer 114 deposited thereon. Further, it has been shown that the emitter is a flat emitter with respect to the fabrication techniques and resulting structure depicted in FIGS. 1-5 in accordance with the present invention, other geometries are also possible utilizing the Schottky metal semiconductor barrier approach.

Figure 5:
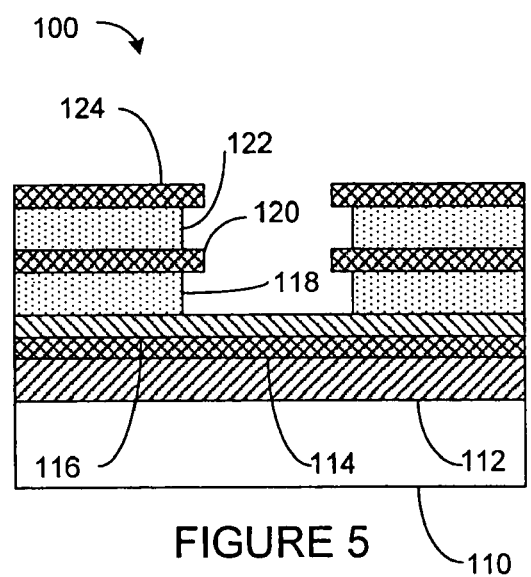
FIG. 5 illustrates a cross-sectional view of the completed field emission emitter device with openings formed to expose the surface of the semiconductor layer in accordance with the present invention.
Figure 6:
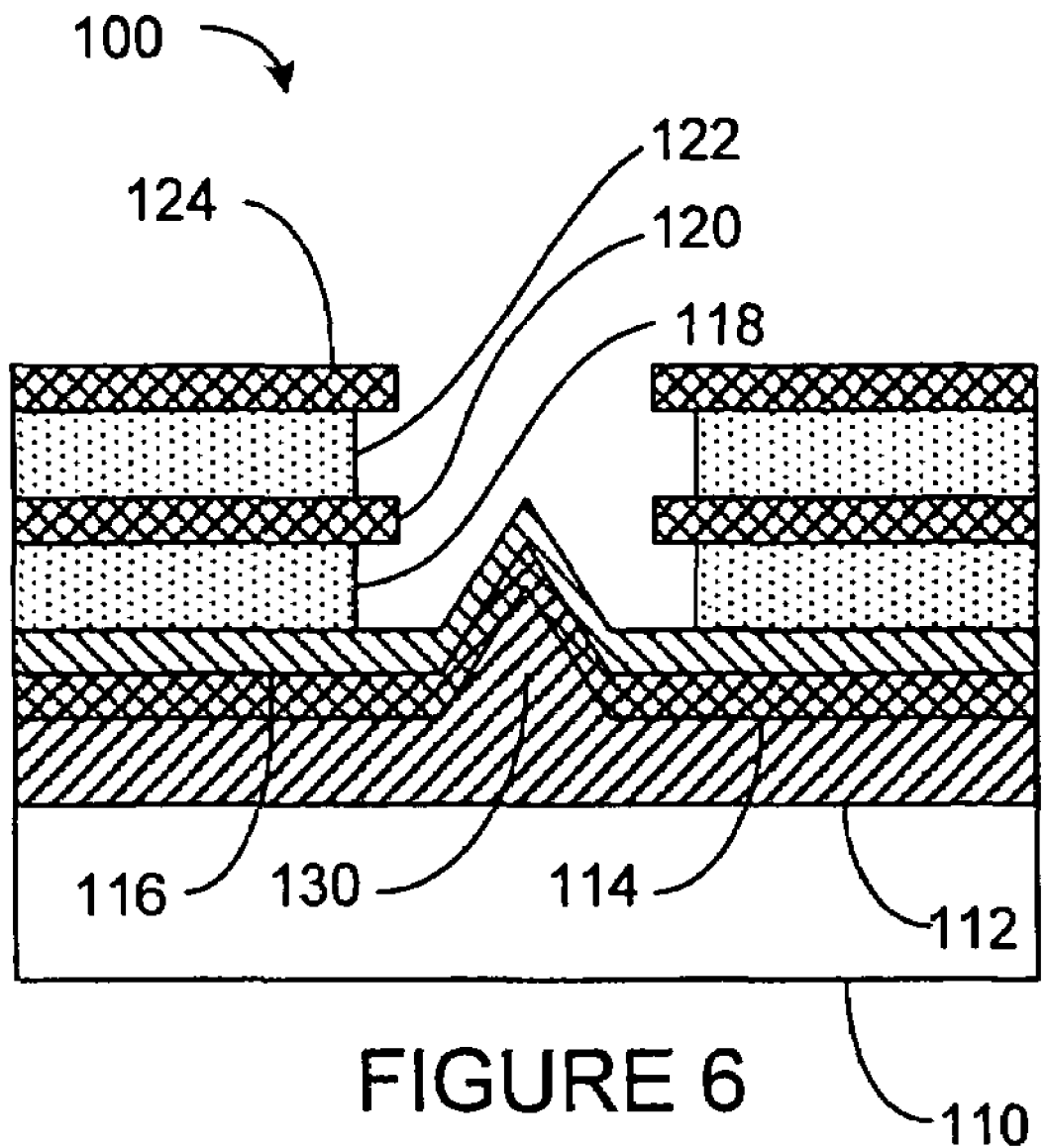
FIG. 6 depicts a cross-sectional side view of a conically-shaped tip emitter using the Schottky metal-semiconductor barrier as an emitter source in accordance with the present invention.

Specifically, a tip-base geometry is also possible as illustrated in FIG. 6. In this structure, the elements are the same as those in FIG. 5 but a base tip 130 is fabricated prior to the steps of providing first metal layer 114 and semiconductor layer 116 as shown in FIGS. 2 and 3 of the present invention. Base tip 130 is fabricated from a metal or semiconductor material. It is formed by using techniques commonly known in the art and used in fabrication of Spindt emitters (C. A. Spindt et. al., J. Appl. Phys. 47(1976) 5248) for display purposes or the isotropic dry etching technique (K. Betsui Tech. Digest, Int. Vacuum Microelectronics Conf., Nagahama, Japan 1991, p. 26, S. E. Huq et al, Microelectronic Engineering 27(1995) p.

95), and the differential wet chemical etching technique for microtip fabrication with Si substrates. (D. F. Howell et al, IEDM 89 digest p. 525)

As illustrated in FIG. 6, the metal layer 114 completely covers the conical tip of the emitter electrode and the semiconductor materials also made from, for example titanium dioxide ($TiO_2$) completely covers the metal material and the tip structure.

The use of the Schottky metal-semiconductor barrier also allows for smaller geometries to be formed with respect to the focus emitter electrodes as well as the extracting electrode. The flat emitter as shown in FIG. 5 has a focus electrode and extraction electrode diameter of generally 2 micrometers with a range from 1 to 10 micrometers. The diameter for the electrodes of FIG. 6 can be even smaller with a preferred diameter of 0.5 micrometer and a range of 0.1 micrometer to 2.0 micrometers. In both cases they achieve a beam width of approximately 10 to 50 nanometers. The focusing electrode provides the ability to collect electrons within a small spot on an anode. Without the use of the focusing electrode, the angle of emission is approximately ±40° for the tip emitters and ±10° for the field flat emitters.

Other embodiments of the invention will be apparent to those skilled in the art from a consideration of this specification or practice of the invention disclosed herein. It is intended that the specification examples be considered as exemplary only, with the true scope and spirit of the invention being indicated by the following claims.

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

The invention claimed is:

1. A process for fabricating electron emission devices, comprising:
   forming an emitter electrode layer;
   forming an extracting electrode layer proximate the conductive semiconductor layer;
   forming an aperture through a portion of the extracting electrode layer to expose a portion of the emitter electrode layer;
   forming a Schottky metal layer on the emitter electrode layer through the aperture; and
   forming a conductive semiconductor layer on the Schottky metal layer through the aperture to form a Schottky metal-semiconductor barrier between the metal layer and the conductive semiconductor layer, thereby forming a solid-state field controlled emitter.

2. A process for fabricating electron emission devices according to claim 1 wherein the Schottky metal layer forming step comprises selecting Pt as the Schottky metal layer.

3. A process for fabricating electron emission devices according to claim 1 wherein the semiconductor layer forming step comprises selecting $TiO_2$ as the conductive semiconductor layer.

4. A process for fabricating electron emission devices according to claim 1 also comprising the step of forming a focus electrode layer above the extracting electrode layer prior to the Schottky metal layer forming step.

5. A process for fabricating electron emission devices according to claim 1 further comprising forming a spacer dielectric between the emitter electrode layer and the extracting electrode layer.

6. A process for fabricating electron emission devices according to claim 4 further comprising forming a second dielectric layer between the extracting electrode layer and the focusing electrode layer.

* * * * *

UNITED STATES PATENT AND TRADEMARK OFFICE
CERTIFICATE OF CORRECTION

PATENT NO. : 7,585,687 B2 Page 1 of 1
APPLICATION NO. : 10/932695
DATED : September 8, 2009
INVENTOR(S) : Henryk Birecki et al.

It is certified that error appears in the above-identified patent and that said Letters Patent is hereby corrected as shown below:

On the Title Page, below "US 2005/0029920 A1 Feb. 10, 2005"
insert -- Related U.S. Application Data
Item (60)   Division of application No. 10/042,927, filed on Jan. 09, 2002, now Pat. No. 6,806,630 --.

In column 1, line 4, below "MANUFACTURE"
insert -- Related U.S. Application Data
The present application is a division of application No. 10/042,927, filed on Jan. 09, 2002, now
Pat. No. 6,806,630, which is incorporated herein by reference in its entirety. --.

Signed and Sealed this

Sixteenth Day of March, 2010

David J. Kappos
*Director of the United States Patent and Trademark Office*